Figure 1:
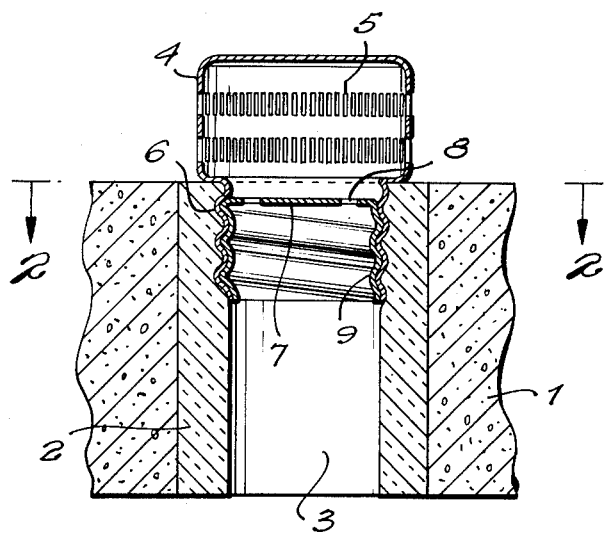

Dec. 23, 1952     N. NILSSON     2,622,739
FILTER NOZZLE

Filed Aug. 6, 1947     2 SHEETS—SHEET 1

INVENTOR.
NILS NILSSON
BY

Dec. 23, 1952     N. NILSSON     2,622,739
FILTER NOZZLE
Filed Aug. 6, 1947     2 SHEETS—SHEET 2
FIG. 3.
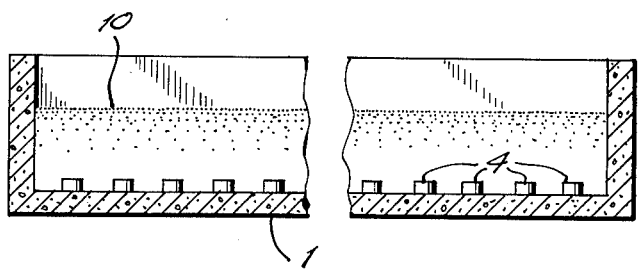
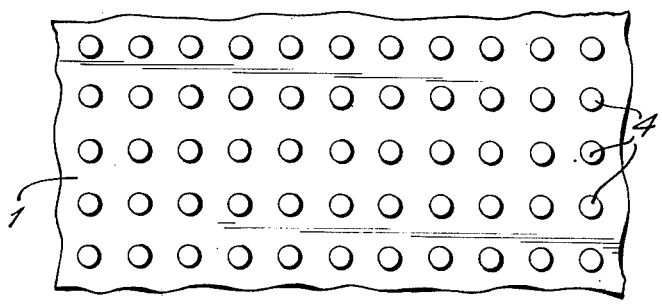
FIG. 4.
INVENTOR.
NILS NILSSON
BY Patented Dec. 23, 1952

2,622,739

UNITED STATES PATENT OFFICE 2,622,739

FILTER NOZZLE

Nils Nilsson, Solsidan, Saltsjobaden, Sweden, assignor to Aktiebolaget Zander & Ingestrom, Stockholm, Sweden, a joint-stock company of Sweden Application August 6, 1947, Serial No. 766,780
In Sweden February 28, 1946

Section 1, Public Law 690, August 8, 1946
Patent expires February 28, 1966

3 Claims. (Cl. 210—171)

The present invention relates to water filters, and more particularly to nozzles in concrete bottom walls of sand filters.

A sand filter generally consists of:

(a) A filter bed, generally consisting of a layer of sand, or a layer of sand supported by layers of gravel, (b) A filter bottom wall supporting the filter bed, (c) A system of underdrains for collecting the clean water and for distributing the wash water, (d) An enclosure, whose bottom walls and side walls are watertight.

Most filters have bottom walls and side walls of reinforced concrete.

The water to be cleaned is let in at the top of the filter, and the quantity of water is so regulated that the surface of the water is held at some distance above the surface of the filter bed. As the water percolates downward through the filter bed, suspended and colloidal matter contained in the raw water are removed and deposited on or in the sand. When the material deposited becomes too dense the water will not percolate at a satisfying rate and the bed must be cleaned. This is accomplished by reversing the flow of water through the filter, the clean wash water being taken in at the bottom of the filter and the dirty water being let off at the top. The upward flow should be strong enough to allow the filter bed to "expand," thus allowing the grains of sand to abrase against each other.

From the foregoing will be seen that the object of the underdrains is twofold; to collect the filtered water and to distribute the wash water. According to the invention the underdrainage system consists of nozzles, arranged in the filter floor. These nozzles must have openings for the filtered water, e. g. slots, small enough to prevent the sand to enter with the water. During washing water flows upwardly and it is very important that the wash water is uniformly distributed in the filter bed. If the distribution is irregular, parts of the sand bed may not be sufficiently cleaned. The impurities removed from the water do not settle uniformly in the same layer. Parts of the sand layer may be more or less clogged, other parts more or less clean. The resistance of the clogged parts to the upward flow of wash water is of course much greater than the resistance of the clean parts. As the flow of the water mainly depends on the resistance, more wash water may pass through the relatively clean parts of the sand than through the dirty parts, which of course is undesirable. It is the main object of the invention to overcome this disadvantage by introducing an additional resistance, consisting of a throttling device in the nozzle. The throttle may consist of a small perforated disk, which should be removable so as to allow adjusting of the openings when necessary. If the openings are sufficiently small, the resistance of the throttling disk will be much greater than the resistance of the sand layer, and the quantity of wash water delivered by the nozzle will thus mainly depend on the throttle, i. e. the condition of the sand will not influence the quantity of the wash water to the same extent as when the throttling device is omitted.

It is well-known that the grain of the sand must be adapted to the nature of the water to be cleaned and to the treatment of the water before filtering. As the nature of the water often varies a great deal, and the method of treatment often must be altered accordingly, it is important that sand of different grain can be used in the filter. This will render it necessary to change the perforation of the filter caps and the opening of the throttling disk. Accordingly it is to be desired that these parts may be exchanged independent of each other. On such occasions, or when broken nozzles are to be replaced, it is of course important that all the parts are easily accessible from the upper side of the filter bottom.

A further object of the invention is to locate said nozzle body as well as the throttling device combined therewith in a vertical channel in the filter bottom, so that they can easily be removed from this channel from the upper side of the filter bottom without any necessity of removing this bottom.

A still further object of the invention is to enable the filter nozzle and the throttling device to be removed simultaneously as one unit, e. g. to detachably join the nozzle and the throttling device, preferably by means of threads. The throttling device may in this case be threaded into a neck portion of the nozzle, which is in turn provided with outer threads, by means of which it is threaded into the said channel or bushing. The throttling device and the nozzle may, however, also be separated from each other or joined together in any other way than has been described hereinbefore.

Figure 2:
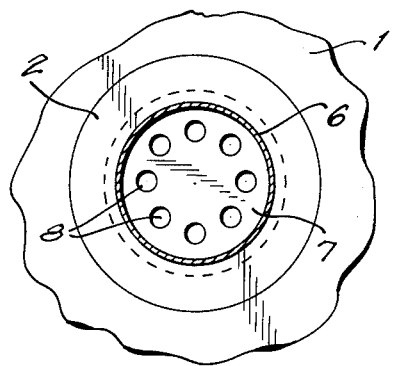

The accompanying drawing illustrates an embodiment of the invention by way of example, Fig. 1 showing a longitudinal section of the device, Fig. 2 being a cross section along the line II—II in Fig. 1, Fig. 3 is a vertical sectional view of a filter bed provided with filter members according to the present invention, and Fig. 4 is a fragmentary plan view of the bottom of a filter bed provided with filter members.

The filter bottom is designated by 1. This bottom is provided with a number of nozzles. For each nozzle there is a channel 3 in the bottom 1 of the filter, and this channel is suitably provided with a bushing 2 of any ceramic or other material. In the bushing 2 or directly in the channel 3 a filter nozzle 4 is threaded or applied in any other way so that it may be removed from the upper side of the bottom 1. The nozzle 4 can be made in various ways and may consist of different material, e. g. metal or ceramic material, synthetic resin or the like. A number of slots or apertures 5 for the discharge of the water and the air are provided in the nozzle in a known manner. The nozzle is also provided with a threaded neck portion 6, by means of which it is threaded into the bushing 2. At the inside of this neck portion there is a choking or throttling disk 7 provided with apertures or perforations 8 and removably applied, for instance by threading its sleeve-like portion 9 into the inner threads of the neck portion 6.

In other respects the construction and effect of the filter may be of any known kind and will therefore not be more fully described or demonstrated here. The nozzle is intended to be used particularly for combined washing of sand filters or the like with water and air simultaneously or separately. The invention resides mainly in its application to sand filters, the nozzle 4 then being used for the discharge of the water during filtering, and for the introduction of a washing agent such as water in opposite direction during cleaning of the sand 10. The channel 3 is thus connected with suitable pipes forming a system of underdrains.

The invention may of course be modified in various manners without departing from the scope of the invention.

What I claim is:

1. In a water filter arrangement including a sand filter bed, in combination, a bottom wall for the sand filter bed, said bottom wall formed with a plurality of holes extending transversely through the same; a plurality of tubular lining members, each secured to the inner surface of one of said holes and having a cylindrical inner surface forming a conduit through said bottom wall, and provided on said inner surface with an inner thread; a plurality of filter members, each filter member having a tubular neck portion having an inner and an outer thread and screwed with said outer thread from above said bottom wall into said inner thread of one of said tubular lining members, and also having a cap portion projecting upwardly from the top surface of said bottom wall into the adjacent portion of the sand filter bed and formed with a plurality of apertures permitting passage of fluid into and out of said conduit but blocking passage of sand; and a plurality of throttle members, each throttle member having a tubular portion provided with an outer thread and a transversely extending disk portion closing said tubular portion at one end thereof, each of said throttle members being screwed with said outer threads on its tubular portion into said inner thread of said tubular neck portion of said filter member so as to be removable from the bottom wall together with said filter member, but to be detachable from the latter, said transversely extending disk portion of each of said throttle members being formed with apertures having a predetermined area so as to offer a predetermined resistance against passage of fluid, said predetermined resistance exceeding the resistance of each of said filter members and of the sand filter bed against passage of said fluid so as to assure a substantially equal flow of fluid through all conduits.

2. For use in a water filter arrangement including a filter bed having a bottom wall provided with holes, a filter member, comprising in combination, a tubular member adapted to be secured in one of said holes in the bottom wall of the filter bed and having a cylindrical inner surface provided with an inner thread; a filter member having a tubular neck portion having an inner and an outer thread and screwed with said outer thread into said inner thread of said tubular member, and also having a cap portion located on top of the tubular neck portion and projecting out of said tubular member, said cap portion formed with a plurality of apertures permitting passage of a fluid; and a throttle member having a tubular portion provided with an outer thread and a transversely extending disc portion integral with said tubular portion and closing the same at one end thereof, said throttle member being screwed with said outer thread on its tubular portion into said inner thread of said tubular neck portion of said filter member, said transversely extending disc portion of said throttle member being formed with apertures having a predetermined area so as to offer a predetermined resistance against passage of the fluid.

3. For use in a water filter arrangement including a filter bed having a bottom wall provided with holes, a filter member comprising in combination, a filter member having a tubular neck portion having an inner and an outer thread and screwed with said outer thread into one of said holes in said bottom wall, and also having a cap portion located on top of the tubular neck portion and projecting out of said tubular member, said cap portion having a substantially cylindrical portion, said cylindrical portion being formed with a plurality of rectangular narrow apertures arranged along at least one circle on said cylindrical portion and permitting passage of a fluid; and a throttle member having a tubular portion provided with an outer thread and a transversely extending disc portion integral with said tubular portion and closing the same at one end thereof, said throttle member being screwed with said outer thread on its tubular portion into said inner thread of said tubular neck portion of said filter member, said transversely extending disc portion of said throttle member being formed with round apertures having a predetermined area so as to offer a predetermined resistance against passage of the fluid.

NILS NILSSON.

REFERENCES CITED

The following references are of record in the file of this patent:

UNITED STATES PATENTS

| Number | Name | Date |
|---|---|---|
| 648,105 | Greer | Apr. 24, 1900 |
| 837,902 | Greth | Dec. 4, 1906 |
| 951,795 | Berwanger | Mar. 15, 1910 |
| 1,066,104 | Glauber | July 1, 1913 |
| 1,261,028 | Houston | Apr. 2, 1918 |
| 1,266,132 | Lassen et al. | May 14, 1918 |
| 1,596,894 | Schifter | Aug. 24, 1926 |
| 1,770,830 | Barbour | July 15, 1930 |
| 2,233,980 | Jewell | Mar. 4, 1941 |